Oct. 29, 1946.  B. W. KEESE  2,410,077
POWER TAKE-OFF UNIT
Filed Feb. 16, 1944  3 Sheets-Sheet 2
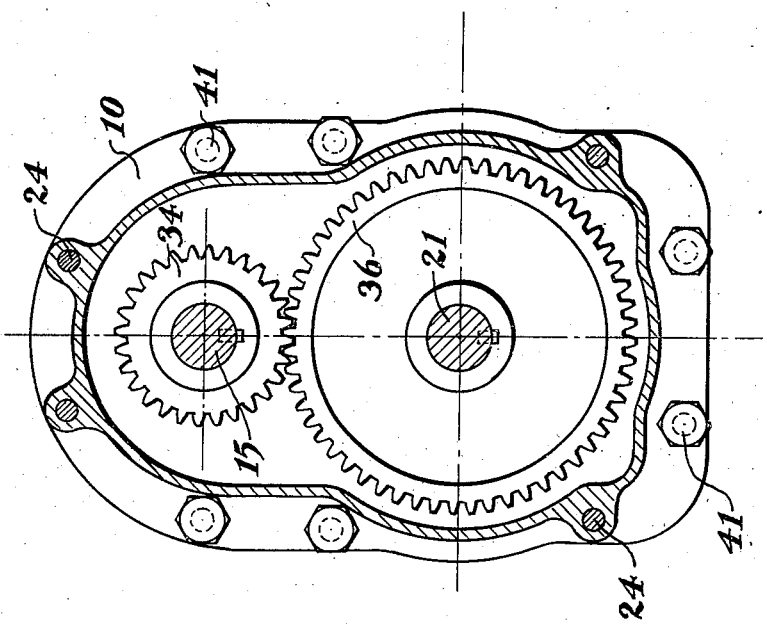
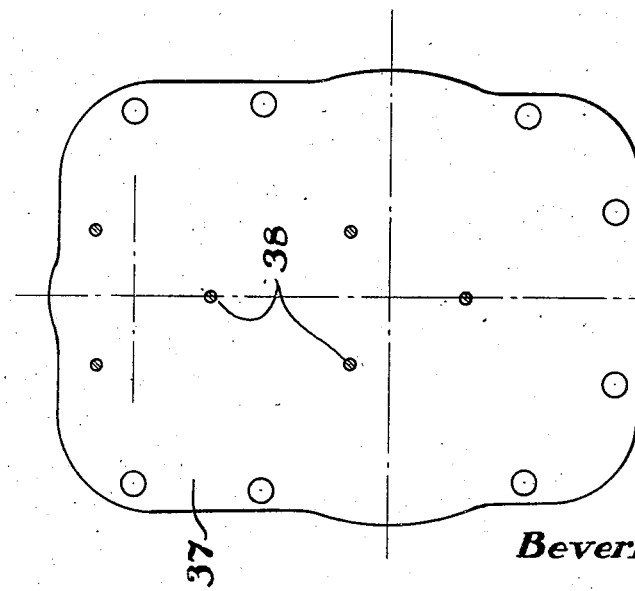
Beverly W. Keese
Inventor
By Strauch & Hoffman
Attorneys Patented Oct. 29, 1946

2,410,077

UNITED STATES PATENT OFFICE 2,410,077

POWER TAKE-OFF UNIT

Beverly W. Keese, Oshkosh, Wis., assignor to The Timken-Detroit Axle Company, Detroit, Mich., a corporation of Ohio Application February 16, 1944, Serial No. 522,641

10 Claims. (Cl. 74—11)

1

This invention relates to an improved power take-off unit and has for its general object and purpose the provision of a simple and compact arrangement of the several elements for easy and quick installation as an operative unit upon a fixed support.

One of the important objects of the invention is to provide sealing or closure means for one side of the unit gear housing chamber which includes a shipping plate attached to the housing structure and which also constitutes a part of means for mounting said unit upon the fixed support with said housing structure directly sustained by the shipping plate out of contact with the support.

A more particular object of the invention is to provide means whereby, in the act of making the installation or attachment, anti-friction bearings for the power input and output shafts of the take-off unit will be automatically and accurately adjusted.

Another object is to provide housing means for the gear elements of the take-off unit embodying a side wall having shaft bearings with adjusting shims and oil distributing means mounted therein; and a shipping cover plate secured to said housing wall to retain said bearings in assembled position during shipment of the take-off unit.

A further object is to provide mounting means for the take-off unit in which the shipping plate sections engaging the bearing adjusting shims will be strongly backed so that the unit will have maximum stability to minimize the effects of mechanical stresses upon the structure and the functional operation of the several elements.

With the above and other objects in view the invention consists in the improved power take-off unit and in the construction and relative arrangement of its several parts, as will be hereinafter more fully described, illustrated in the accompanying drawings and subsequently incorporated in the subjoined claims.

Referring to the drawings in which similar reference characters designate corresponding parts throughout the several views:

Figure 2 is a vertical transverse sectional view, taken substantially on the line 2—2 of Figure 1;

Figure 3 is a side elevation of the take-off unit as prepared for shipment; and

2

Figure 1:
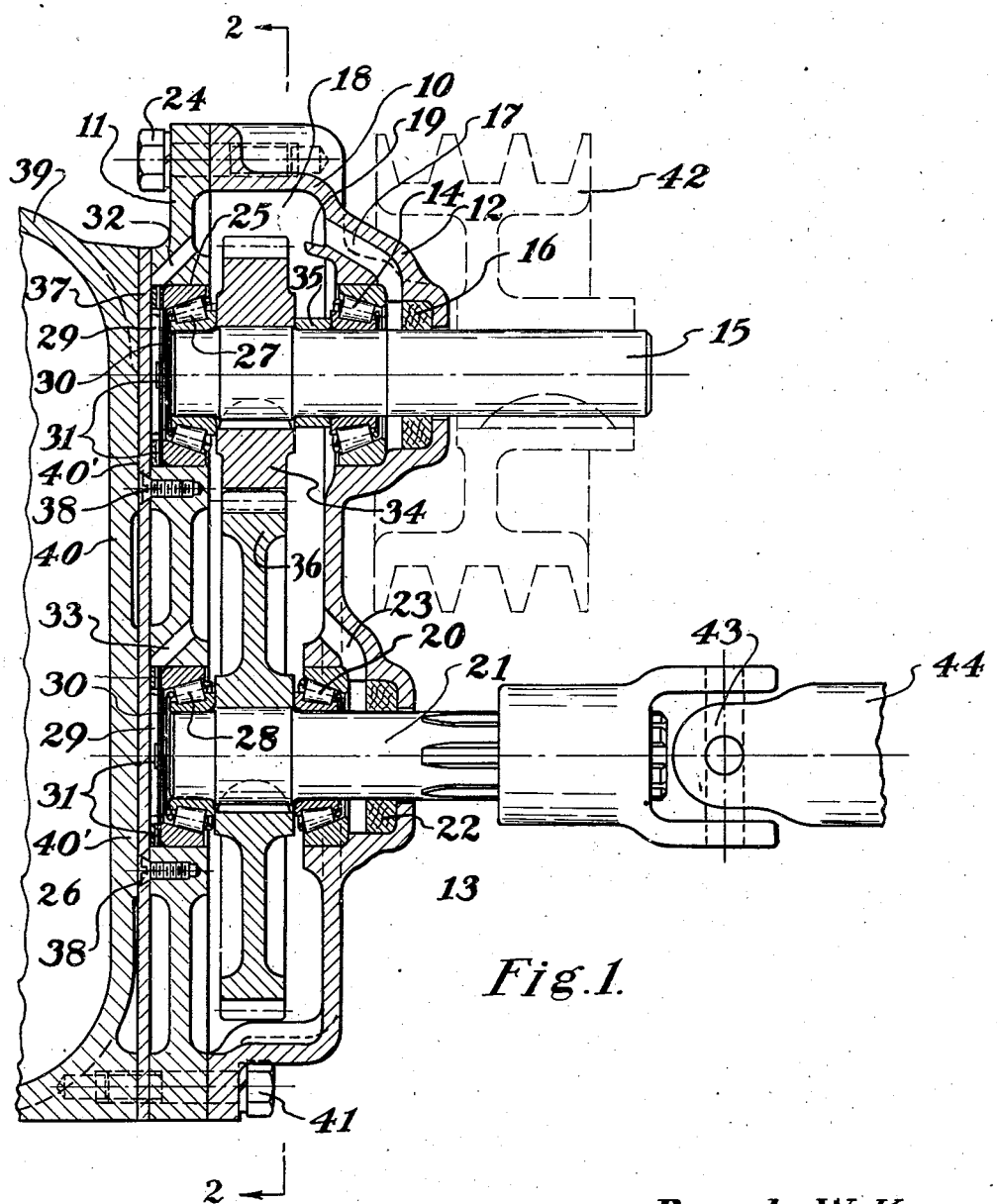
Figure 1 is a vertical longitudinal sectional view showing one practical embodiment of my new power take-off unit, mounted or installed in an operative position with relation to a selected part of the driving system of a motor vehicle.
Figure 4:
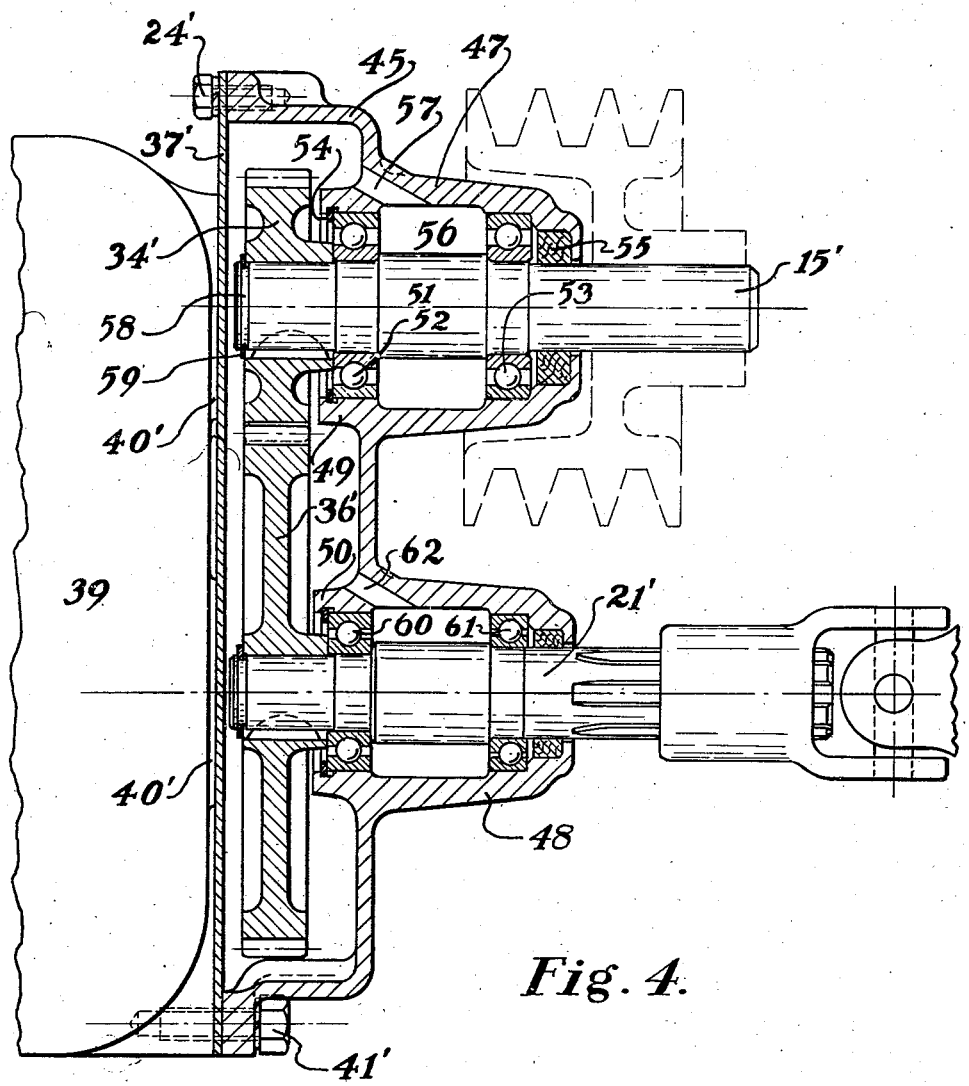

Figure 4 is a vertical sectional view, similar to Figure 1, showing an alternative embodiment of the invention, in which the shipping plate also serves as a cover or closure for an open side of the gear housing body and the input and output shafts are mounted in spaced bearings on the opposite side wall of said body.

For purposes of the present explanation, I have selected an embodiment of the invention in which the relatively movable parts of the power take-off mechanism are contained within a two part housing comprising the body section 10 and cover section 11. This housing structure may be of any desired external configuration and the side wall of the body section 10 is formed with two vertically spaced, outwardly projecting bosses 12 and 13 respectively. The boss 12 is internally formed to receive a suitable type of anti-friction bearing 14 for the power input shaft 15 and a conventional form of oil seal 16 is outwardly spaced from said bearing. To this space lubricating oil is supplied through the duct 17 which is downwardly inclined from the upper end of the housing gear chamber 18, from which the oil is directed into the upper end of said duct by the inwardly projecting lip 19.

Similarly the lower boss 13 is internally formed to receive the anti-friction bearing 20 for the power output shaft 21 and an oil seal 22 is spaced from said bearing. To this space oil is supplied through the downwardly inclined duct 23 communicating at its upper end with the housing gear chamber.

The cover section 11 of the housing is adapted to be secured to the peripheral wall of the body section 10 over the open side of the latter, by means of suitable bolts 24, and is provided with vertically spaced openings 25 and 26, respectively complementary to the bosses 12 and 13. These openings receive the shaft-end supporting anti-friction bearings 27 and 28, respectively, for the power input and output shafts 15 and 21. At the outer side of each bearing an oil distributing disk 29, with a bearing adjusting shim 30 interposed between said disk and the outer bearing ring, is arranged in the openings 25 and 26, respectively, of the housing cover section. The inner face of each disk 29 is provided with a plurality of radially disposed oil distributing grooves or channels 31 to which oil is supplied through the inclined ducts 32 and 33, respectively, from the housing gear chamber, said ducts opening at their lower ends on the outer face of the housing cover 11.

A small diameter spur gear 34 is splined or otherwise suitably fixed to the power input shaft 15 for operation within the upper end of the housing chamber 18 and a spacer ring 35 surrounds said shaft between the gear 34 and the inner race ring of bearing 14.

The teeth of the gear 34 are in mesh with the teeth of a spur gear 36 of relatively large diameter, the hub portion of which is splined or otherwise fixed to the power output shaft 21 between and in contact with the inner race rings of bearings 20 and 28. It will, of course, be understood that any other desired power transmitting means between the shafts 15 and 21 may be employed.

In preparing the above described unit for shipment the shafts 15 and 21 with their respective anti-friction bearings and oil seals are first assembled with the housing body section 10 by inserting said shafts from the open side of the housing section through the respective bosses 12 and 13. The cover section 11 with the bearings, 27 and 28, is then applied and secured in place by the bolts 24. The oil distributing disks 29 and shims 30 are now inserted in the openings of the housing cover at the outer sides of the bearings 27 and 28 and finally the shipping cover plate 37, preferably a thin sheet of metal or other equivalent material, is applied to the outer face of the cover section 11 of the housing. This plate extends over and closes the openings 25 and 26 and retains the disks 29 and shims 30 in place. The shipping plate is secured in attached relation to the housing cover by means of a plurality of screws 38. However, it is not necessary that this connection should be such as to provide oil tight contact between the opposed surfaces of the plate 37 and housing cover 11.

It will be readily seen that the several parts of the power take-off unit may be easily and quickly assembled and conveniently shipped to the point of application or use. In the present instance I have shown said unit operatively mounted or supported upon a vertical side wall 40 of an axle gear casing 39 or other fixed structural part of the driving system of a tractor or other motor operated vehicle. For this purpose the housing cover section 11 and a peripheral flange on the body section 10 are provided with registering openings to receive the attaching bolts 41 having threaded engagement in suitable bores formed in the wall 40 which is preferably formed with spaced pads or bosses 40' on its outer surface. As said bolts are tightened the shipping cover 37 is forced into oil tight contact with the face of the housing cover section 11 and pressure is applied to the disks 29 forcing the shims 30 against the outer race rings of the anti-friction bearings 27 and 28 which are automatically adjusted to their final positions. The sections of the shipping plate or cover 37 which extend over the bearing openings 25 and 26 are strongly backed by the pads or bosses 40'. Thus maximum efficiency in the operation of the unit will be assured. The plate 37 seals the openings 25 and 26 in the housing wall 11 and, together with said wall, completely closes the gear chamber at one side of the housing.

While any desired means may be employed for supplying power to the input shaft 15, for this purpose I have shown a belt drive pulley 42 suitably fixed to the end of said shaft externally of the gear housing. The driving belt (not shown) may be operatively connected in any suitable manner with a power driven axle or with a motor or other power source through a variable speed transmission unit.

Also power may be transmitted from the output shaft 21 to a remote point by any well known means for the operation of an auxiliary machine. Thus the end of said shaft may be operatively connected with the machine by a conventional type of universal joint 43 and propeller shaft 44.

I have above referred to a two-part housing for the take-off gearing. However, I also contemplate the use of a one piece housing having a suitably located access opening through which the power input and output shafts and connecting gearing may be conveniently assembled in the housing structure.

In Figure 4 of the drawings I have disclosed a somewhat simplified embodiment of my invention in which ball instead of roller bearings are provided for the input and output shafts. In this construction the gear housing structure 45 is entirely open on one side. The opposite side wall 46 thereof has two relatively long, laterally extending bearing bosses 47 and 48, respectively, integrally formed therewith. The wall of each boss, at its connection with the housing wall, is extended for a short distance into the gear chamber of the housing, as at 49 and 50 respectively.

The power input shaft 15' has a section 51 of enlarged diameter providing spaced annular shoulders thereon for abutting contact with the inner race rings of ball bearings 52 and 53, respectively, of conventional type. The bearing 52 is locked in its adjusted position in the boss extension 49 by the snap ring 54 and a conventional oil seal 55 is arranged in said boss at the outer side of the bearing 53. The space between the shaft section 51 and the wall of boss 47 provides an annular chamber 56 to which lubricating oil for the bearings 52 and 53 is supplied through the duct 57 from the gear chamber of the housing 45. At one side of the spur gear 34' its hub portion is engaged with the inner race ring of bearing 52 and at its opposite side the end of shaft 15' is formed with the annular groove 58 to receive the locking ring 59.

The power output shaft 21', driven by the spur gear 26' is mounted in the boss 48 and extension 50 thereof in a similar manner, the spaced ball bearings 60 and 61 for said shaft being supplied with lubricant from the gear chamber through the duct 62. The only difference in the mountings for the input and output shafts is that the bearings 52 and 53 of the former, to which the driving power is applied, are of greater size than the bearings 60 and 61 for the output shaft. Of course, the bearing receiving boss 47 is, necessarily, of greater diameter than the boss 48.

In Figure 1, the shipping plate 37 extends over the outer ends of the openings 26 and 27 in the housing cover wall 11 and thus acts to seal and completely close the gear chamber of the housing. In Figure 4, since all of the shaft bearings are on the same side of the housing 45, the cover 11 is dispensed with and the shipping plate 37' serves as the entire closure means for the open side of the gear chamber of the housing, as well as the means for directly sustaining the take-off unit in attached relation to the support 39. Therefore, this plate, in addition to the openings which receive the attaching bolts 41', is also provided, adjacent its perimeter, with suitably spaced openings to receive the bolts 24' which tightly secure said plate to the peripheral wall of the housing 45 over the open side thereof.

It will be evident that the construction last described, utilizing ball instead of roller bearings, is in several respects simpler and less expensive to produce than the consruction shown in Figures 1 to 3 and, in many cases, may be preferred to the latter. In both forms it will be noted that the shipping plate is utilized as a part of the means for mounting the take-off unit upon the support 39, and that spaced apart areas of the plate are in contact with the support so that a more effective oil-tight closure of the gear chamber is obtained. This plate also provides a desirable means for directly sustaining the housing structure out of contact with the support.

From the above description the several advantages of the present invention may be readily appreciated. The power take-off unit embodies a simple, compact and efficiently operating assembly of the several elements with means which assures adequate protection thereof in shipment and in which the necessity of making bearing adjustments prior to the final mounting of the unit in operative position is avoided. It will also be noted that the mounting or attaching means for the unit provides an extensive supporting surface area, contributing greatly to stability and minimizing the destructive effect of vibratory stresses upon the structure and functional efficiency of the several parts.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A power take-off unit including a housing structure comprising a body section and a cover section for the open side of said body section; power input and output shafts; anti-friction bearings rotatively supporting said shafts in the body and cover sections of the housing; said cover section having bearing receiving openings therethrough; means in said housing for transmitting power from the input to the output shaft; means rigidly securing the housing sections in connected relation; and a shipping plate attached to and extending over the outer side face of the cover section to retain the anti-friction bearings in assembled relation with said housing cover section.

2. A power take-off unit including a housing structure comprising a body section and a cover section for an open side of said body section; power input and output shafts; anti-friction bearings rotatively supporting said shafts in the body and cover sections of the housing; said cover section having bearing receiving openings therethrough; oil distributing means in said openings at the outer side of the respective bearings; said cover section having oil supply ducts leading to said distributing means from the housing gear chamber; means in said housing for transmitting power from the input to the output shaft; means rigidly securing the housing sections in connected relation; and a shipping plate attached to and extending over the outer side face of the cover section to retain the oil distributing means and anti-friction bearings in assembled relation with said housing section.

3. A power take-off unit including a housing structure comprising a body section and a cover section for an open side of said body section; power input and output shafts; anti-friction bearings rotatively supporting said shafts in the body and cover section of the housing; said cover section having bearing receiving openings therethrough; oil distributing means in said openings at the outer side of the respective bearings; said cover section having oil supply ducts leading to said distributing means from the housing chamber; an adjusting shim between each bearing and the associated oil distributing means; and a shipping plate attached to and extending over the outer side face of the cover section to retain the oil distributing means, shims and anti-friction bearings in assembled relation with said housing cover section.

4. A power take-off unit including a housing structure comprising a body section and a cover section for an open side of said body section; power input and output shafts; anti-friction bearings rotatably supporting said shafts on the housing body section; said cover section having bearing receiving openings, therethrough; anti-friction bearings in said openings rotatively supporting said shafts on the housing cover section; lubricant distributing means for said bearings including distributing disks positioned in said openings at the outer sides of the bearings; adjusting shims interposed between said disks and the bearings; means in said housing for transmitting power from the input to the output shafts; means rigidly securing the housing sections in connected relation to adjust the bearings in the housing body section; a shipping plate attached to the outer side face of the housing cover section and extending over said distributing disks in non-oil tight contact therewith; and means for rigidly mounting said housing structure upon a fixed support with said shipping plate in contact therewith to establish oil-tight contact of said plate with the housing cover section and lubricant distributing disks and to simultaneously effect the final adjustment of said anti-friction bearings in the housing cover section.

5. A power take-off unit including a housing structure comprising a body section and a cover section; power input and output shafts; anti-friction bearings rotatively supporting said shafts on the housing body section; said cover section having bearing receiving openings; anti-friction bearings in said openings rotatively supporting said shafts on the housing cover section; lubricant distributing means for said bearings including distributing disks positioned in said openings at the outer sides of the bearings; said housing cover sections having lubricant supply ducts for said disks opening upon the outer face of the housing cover section; adjusting shims interposed between said disks and the bearings; means in said housing for transmitting power from the input to the output shaft; means rigidly securing the housing sections in connected relation to adjust the bearings in the housing body section; a shipping plate attached to the outer side face of the housing cover section and extending over said distributing disks in non-oil tight contact therewith; and means for rigidly mounting said housing structure upon a fixed support with said shipping plate in contact therewith to establish oil-tight contact of said plate with the lubricant distributing disks and with the housing cover section over the open ends of said supply ducts, and to simultaneously effect the final adjustment of said anti-friction bearings in the housing cover section.

6. In combination with a fixed support, a power take-off unit comprising a two part housing structure; power input and output shafts; anti-friction bearings supporting said shafts in opposite side walls of the housing; one of said walls having bearing receiving openings extending therethrough; bearing adjusting shims in said openings at the outer sides of said bearings; a shipping plate attached to the outer face of said housing wall and extending over the openings therein; means for supplying lubricant to said bearings; and means rigidly securing the housing structure to said fixed support with the shipping plate in face to face contact with said support, whereby oil-tight contact is established between said plate and the housing wall and said shims are positioned within the openings to retain the bearings in finally adjusted relation to the housing wall.

7. In combination with a fixed support having spaced apart bosses provided with plane surfaces located in a common plane, a power take-off unit comprising a housing structure; power input and output shafts; anti-friction bearings supporting said shafts in opposite side walls of the housing; one of said walls having bearing receiving openings therethrough; bearing adjusting shims in said openings at the outer sides of said bearings; a shipping plate attached to the outer face of said housing wall and extending over the openings therein; and means rigidly securing the housing structure to said fixed support with the parts of the shipping plate which overlie said bearing openings in face to face contact with the plane surfaces of said bosses; whereby oil-tight contact is established between said plate and the housing wall and said shims are positioned within the openings to retain the bearings in finally adjusted relation to the housing wall.

8. A power take-off unit including a housing structure having opposite side walls each provided with spaced bearing receiving openings; input and output shafts; anti-friction bearings rotatively supporting the respective shafts in corresponding openings in the housing walls; adjusting shims and oil distributing means for the bearings in one of the housing walls, and a shipping plate attached to and extending over the outer side face of the latter housing wall to retain the oil distributing means, shims and anti-friction bearings in assembled relation within the openings thereof.

9. In combination with a fixed support, a power take-off unit comprising a housing structure having a gear chamber; power input and output shafts; anti-friction bearing means supporting said shafts on one side wall of said gear chamber, and closure means for the opposite side of said chamber including a shipping cover plate, means for attaching said plate to the housing structure, and a common means securing the housing structure and shipping plate in rigidly fixed relation to each other and to said support, with the shipping plate directly sustaining the housing structure out of contact with the support.

10. In combination with a fixed support, a power take-off unit comprising a housing structure having a gear chamber open at one side and a wall closing the opposite side of said chamber; power input and output shafts; a pair of spaced apart anti-friction bearings for each of said shafts mounted on said side wall of the gear chamber; a shipping plate attached to the housing structure over the open side of the gear chamber; and means for mounting said take-off unit with said housing structure and shipping plate in rigidly fixed relation to each other and to the support, and with one face of said plate having spaced apart areas thereof in contact with the support, said shipping plate constituting the sole means directly sustaining the housing structure out of contact with the support.

BEVERLY W. KEESE.